UNITED STATES PATENT OFFICE.

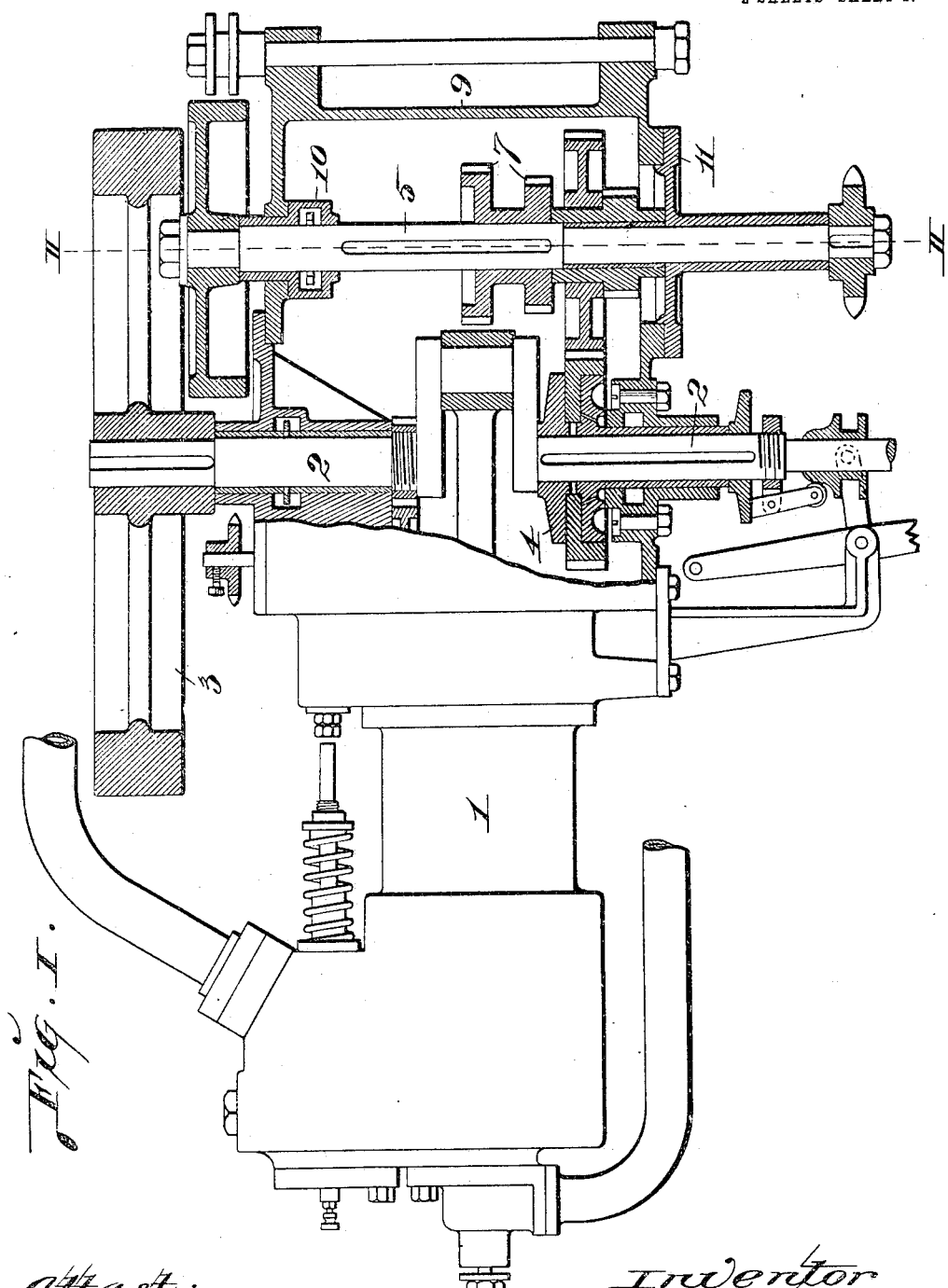

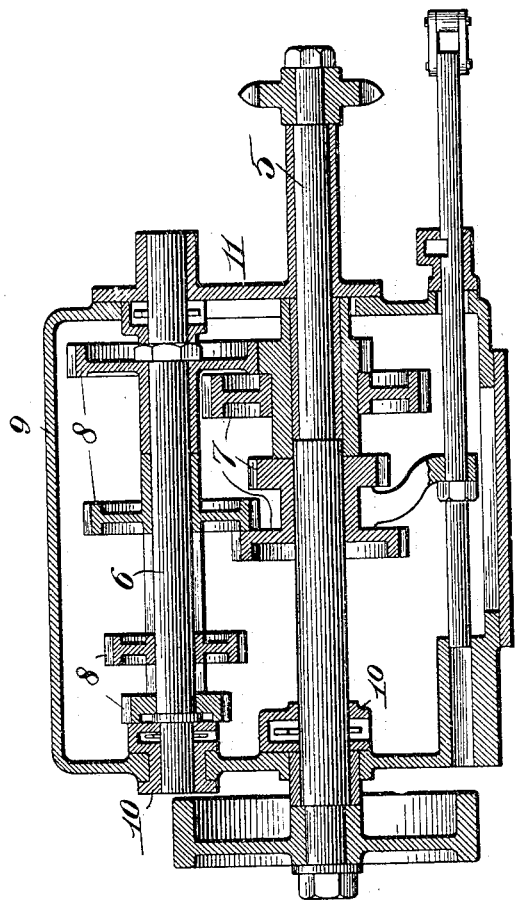

GEORGE P. DORRIS, OF ST. LOUIS, MISSOURI.

GEARING.

No. 801,712.     Specification of Letters Patent.     Patented Oct. 10, 1905.

Application filed October 12, 1904. Serial No. 228,238.

*To all whom it may concern:*

Be it known that I, GEORGE P. DORRIS, a citizen of the United States, residing in the city of St. Louis and State of Missouri, have invented certain new and useful Improvements in Gearing, of which the following is a full, clear, and exact description, reference being had to the accompanying drawings, forming part of this specification.

My invention relates to a housing that forms an extension of the casing of a motor-vehicle vapor-engine and through means of which the engine-crank, the clutch associated therewith, and the transmission-gear are completely housed in a manner to exclude all dust and dirt therefrom and maintain proper lubrication of the parts.

The invention consists in features of novelty hereinafter fully described, and pointed out in the claims.

Figure I is a view, partly in plan and partly in horizontal longitudinal section, illustrating an engine with my housing applied thereto. Fig. II is a vertical transverse section taken on line II II, Fig. I.

1 designates a vapor-engine in the extension of which is journaled the crank-shaft 2, bearing the usual fly-wheel 3. Encircling the crank-shaft 2 is the clutch 4, that may be of any common construction. This clutch is located within the engine extension.

5 and 6 are transmission-gear shafts on which are mounted the transmission-gears 7 and 8, so disposed as to be placed in gear with the clutch 4 on the crank-shaft 2.

9 designates a main housing member that extends forwardly from a position at the rear of the transmission-gears and their shafts and which, with the engine extension, incloses the crank of the engine and the transmission-gears both above and below and at its ends by extending to the engine extension. The shafts 5 and 6 are journaled in boxes 10, positioned in one end of the main housing member and in a cap-plate 11, located at the other end of the housing member. By incasing the driving mechanism associated with a vapor-engine in the manner described I completely house all of the gear members that must of necessity be kept lubricated in the operation of the motor-vehicle and which as a consequence of the lubrication have heretofore been constantly subject to accumulation of dust and dirt to the detriment of their proper working. Also by incasing such parts I provide for the better attention of the lubricant thereon, so that lubrication of the mechanism is necessitated much less frequently than where the gearing is exposed, as heretofore.

The housing, furthermore, provides a medium by which the gearing-shafts may be perfectly alined and their alinement thoroughly maintained, due to the housing being disposed as a unit with the engine extension.

I claim as my invention—

1. The combination with a cylinder of a motor-vehicle vapor-engine having an extension, the engine crank-shaft mounted therein, a clutch and transmission-gearing associated with said crank-shaft and clutch, of a housing attached to said engine extension and serving in its association therewith to incase said clutch, crank-shaft and transmission-gearing, substantially as set forth.

2. The combination with the cylinder of a motor-vehicle vapor-engine having an extension, the engine crank-shaft mounted therein, a clutch and transmission gearing associated with said crank-shaft and clutch, of a housing attached to said engine extension and serving in its association therewith to incase said clutch, crank-shaft and transmission-gearing, and bearing members fitted to and forming a part of said housing in which the shafts of said transmission-gearing are journaled, substantially as set forth.

GEORGE P. DORRIS.

In presence of—
NELLIE V. ALEXANDER,
BLANCHE HOGAN.